United States Patent [19]

Schitter et al.

[11] Patent Number: 5,774,928
[45] Date of Patent: Jul. 7, 1998

[54] SCREEN WIPER APPARATUS, ESPECIALLY FOR A MOTOR VEHICLE, HAVING MEANS, FOR INDEXING THE SCREEN WIPER WITH RESPECT TO A DRIVE SPINDLE

[75] Inventors: Jack Schitter, Antran; Jean-Paul Danjou, Chatellerault, both of France

[73] Assignee: Valeo Systemes D'Essuyage, La Verriere, France

[21] Appl. No.: 791,820

[22] Filed: Jan. 30, 1997

[30] Foreign Application Priority Data

Jan. 31, 1996 [FR] France .................... 96 01153

[51] Int. Cl.⁶ .................................... B60S 1/34
[52] U.S. Cl. ..................... 15/250.34; 15/250.31; 403/4
[58] Field of Search .............. 15/250.34, 250.31, 15/250.3, 250.351, 250.352, 250.202; 403/24, 3, 4, 263, 292, 298

[56] References Cited

U.S. PATENT DOCUMENTS

| | | | |
|---|---|---|---|
| 3,016,766 | 1/1962 | Hoyler | 15/250.3 |
| 3,026,555 | 3/1962 | Dudley | 15/250.202 |
| 3,135,982 | 6/1964 | Carlisle | 15/250.3 |
| 4,262,383 | 4/1981 | Sohn | 15/250.34 |
| 5,412,833 | 5/1995 | Hayden | 15/250.34 |

FOREIGN PATENT DOCUMENTS

| | | |
|---|---|---|
| 491603 | 6/1992 | European Pat. Off. . |
| 673813 | 9/1995 | European Pat. Off. . |

*Primary Examiner*—Gary K. Graham
*Attorney, Agent, or Firm*—Morgan & Finnegan, LLP

[57] ABSTRACT

In a screen wiper apparatus for a motor vehicle, a drive shaft is mounted for rotation about its axis in a fixed bearing. The apparatus includes a screen wiper having a drive head which is fixed on the drive spindle by coupling means. Complementary indexing means are provided, for indexing the angular position of the drive head with respect to the drive spindle, in which the drive head includes an element having a form complementary with that of a corresponding indexing element carried by a member which is coupled in rotation to the drive spindle.

5 Claims, 3 Drawing Sheets

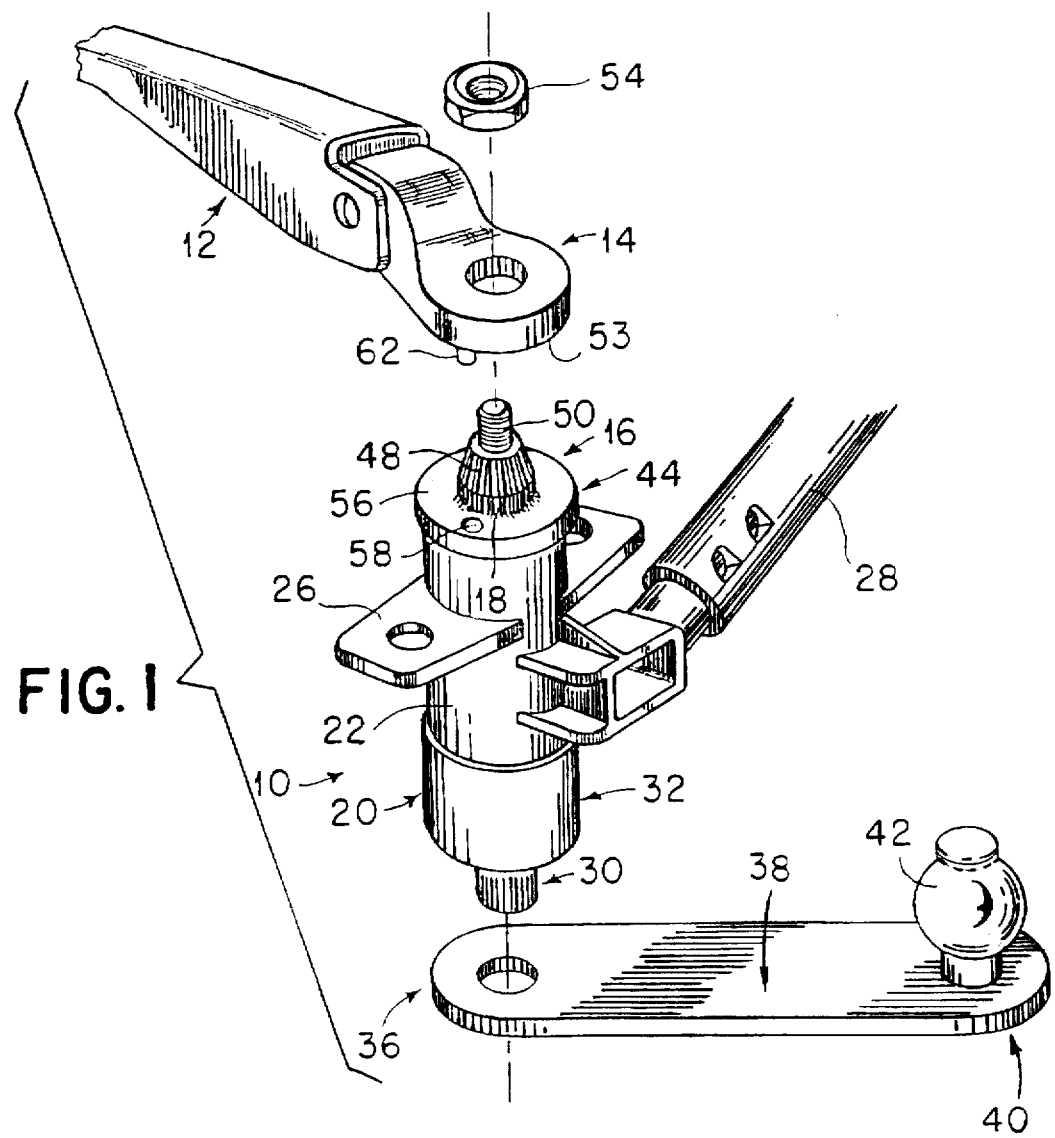
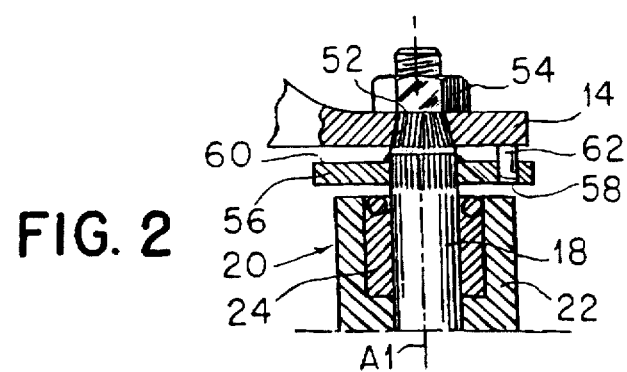

5,774,928

SCREEN WIPER APPARATUS, ESPECIALLY FOR A MOTOR VEHICLE, HAVING MEANS, FOR INDEXING THE SCREEN WIPER WITH RESPECT TO A DRIVE SPINDLE

FIELD OF THE INVENTION

This invention relates to a screen wiper apparatus, especially for a motor vehicle, having means for indexing the screen wiper with respect to a drive spindle of the apparatus, and the like. More particularly, the invention relates to a screen wiper apparatus for a motor vehicle, of the type in which a drive spindle is mounted for rotation about its axis in a bearing which is fixed on a structural element of the vehicle. The apparatus being further of the type in which the drive spindle has an upper end which extends out of the bearing, with a drive head of a screen wiper (which is itself a part of the apparatus) being fixed on the upper end of the drive spindle by coupling means. The apparatus being also of the type in which a crank, coupled to a drive motor through a linkage, drives the spindle and drive head, and therefore also the screen wiper, in rotary movement.

BACKGROUND OF THE INVENTION

In order to couple the drive head and the drive spindle for rotation together, corresponding conical surfaces are generally provided, for cooperation with each other, on each of these two components (i.e. the drive head and spindle). Once the two components are secured firmly one against the other, these conical surfaces enable the shaft to drive the wiper in the usual alternating or oscillating wiping movement.

In order to increase the torque which can be transmitted by this type of coupling, the conical surfaces are usually splined. However, when the screen wiper is being fitted on the drive spindle, it is necessary to ensure precise relative positioning of these two components, both for aesthetic reasons and in order to prevent the screen wiper being driven off the swept surface during its oscillating wiping motion over the latter.

To this end, it has previously been proposed to make use, for example, of templates for locating the screen wiper with respect to the bodywork of the vehicle while the wiper is being fitted. It has also been proposed to index the position of the drive spindle with respect to the bearing in which the spindle is mounted for rotation, the bearing being itself fixed on the structure of the vehicle.

Such indexing means must be of a temporary nature, given that the screen wiper is caused to move with respect to the fixed elements of the structure of the vehicle. In addition, it has for example been proposed to use a frangible pin, which is carried for example by the bearing or by an element which is fixed to the bearing, and which is received within an indexing notch formed on the drive head. The first time the screen wiper is used, this pin is broken, and releases the drive head for relative movement with respect to the bearing. Such an arrangement has the disadvantage that the frangible pin runs the risk of not breaking in the exact position desired.

In addition, it cannot be foretold in advance with any certainty what will happen to the pin once it is broken. Thus, in some cases the pin may remain jammed between the bearing and the drive head, thus hindering proper working of the screen wiper apparatus.

In addition, such an arrangement only enables the screen wiper to be indexed with respect to a fixed element of the structure of bodywork of the vehicle, and not with respect to the drive spindle itself. Thus, if the drive spindle is not positioned during fitting of the screen wiper in its position that corresponds to the rest position of the screen wiper, the result will be an angular offset of the end positions in the wiping travel of the screen wiper, which may therefore be driven beyond the edges of the glass surface being swept.

DISCUSSION OF THE INVENTION

With the object of providing a solution to the above mentioned problem, the invention proposes a screen wiper apparatus of the particular type defined above under the heading "Field of the Invention", which is characterised in that indexing means are provided for indexing the angular position of the drive head with respect to the drive spindle, in which the drive head includes an indexing element having a form complementary to that of a corresponding indexing element carried by a member coupled in rotation with the drive spindle.

According to a preferred feature of the invention, each of the means, respectively coupling and indexing the drive head and the drive spindle together, define complementary forms which come into engagement with each other by axial mating engagement when the head is fitted axially downwardly on to the upper end of the drive spindle; and the indexing means come into cooperating engagement with each other before the coupling means come into cooperating engagement with each other.

Preferably, the member coupled in rotation with the drive spindle is arranged on the upper end of the drive spindle, between an upper end of the bearing and the drive head. In that case, in preferred embodiments the indexing elements, having complementary forms, are disposed respectively on a lower face of the drive head and on an upper face of the member coupled to the drive spindle.

In some embodiments, the member coupled to the drive spindle consists of a ring fixed on the drive spindle. Such a ring preferably includes a cylindrical lateral skirt portion which projects downwardly around the upper end of the bearing.

The member coupled to the drive spindle may be the above mentioned crank, which, in that case, is located on the upper end of the drive spindle.

The drive head may include an indexing spigot which projects axially downwardly and is received in a complementary indexing hole formed in the member which is coupled to the drive spindle.

Alternatively, the drive head may have an indexing hole, which receives a complementary indexing spigot carried by the member that is coupled to the drive spindle.

In another version according to the invention, the member coupled to the drive spindle includes, on an upper face of the latter, an indexing pad which is received in a recess of complementary form which is formed in a lower face of the drive head.

In some embodiments of the invention, the coupling means coupling the drive head and the drive spindle together include complementary conical surfaces, with the member coupled in rotation to the drive spindle being disposed below the conical surface which is carried by the drive spindle.

Further features and advantages of the invention will appear more clearly on a reading of the following detailed description of preferred embodiments of the invention, which is given by way of non-limiting example only and with reference to the accompanying drawings.

BRIEF DESCRIPTION OF THE DRAWINGS

FIG. 1 is an exploded perspective view of a screen wiper apparatus in accordance with the invention.

FIG. 2 is a partial view in axial cross section showing the assembly of a screen wiper on a drive shaft, in accordance with the invention.

DESCRIPTION OF PREFERRED EMBODIMENTS OF THE INVENTION

Figure 3:
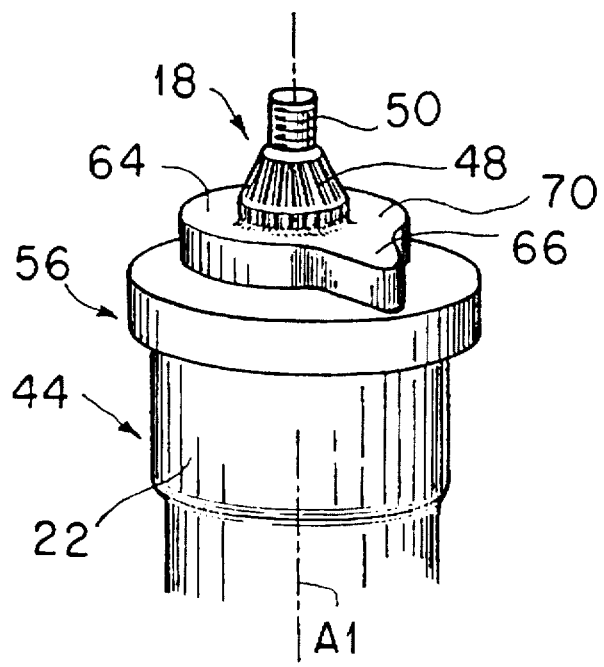
FIG. 3 is a partial perspective view showing a modified embodiment of the invention, relating to the means for indexing the screen wiper with respect to the drive shaft.

The drawings show a screen wiper apparatus 10 for wiping a glass surface of a motor vehicle, for example the windshield of the vehicle. The screen wiper apparatus comprises a screen wiper 12, having a wiper arm which carries a drive head 14 at one end of the arm. The drive head 14 is mounted on the upper end 16 of a shaft or drive spindle 18. The drive spindle 18 is mounted, for rotation about its axis A1, within a bearing 20. The axis A1 of the drive spindle 18 is substantially at right angles to the screen wiper 12, and therefore at right angles to the glass surface to be swept (also referred to herein as the swept surface). The swept surface is not shown in the drawings.

The bearing 20 consists essentially of a tubular body 22, in which the drive spindle 18 is mounted by means of a split plain bearing bush 24. The tubular body 22 is fixed on a structural or bodywork element (not shown) of the vehicle, through two fastening ears 26 which project on the outside of the body 22 at right angles to the axis A1.

In a manner known per se, a bearing of this type can be connected, by means of a rigid coupling bar 28, to a second bearing or to another point of attachment on the fixed structure of the vehicle.

The lower end 30 of the drive spindle 18 extends beyond and below the lower end 32 of the body 22, and it is knurled in such a way as to enable one end 36 of a crank 38 to be force-fitted on to the end 30 of the drive spindle. The crank 38 lies generally in a plane at right angles to the axis A1, and its other, or second, end 40 carries a ball coupling 42 which enables the crank 38 to be coupled to a motorised gearbox unit (not shown) through a suitable linkage, which is again not shown. The arrangement is such that the motor of the motorized gear unit drives the drive spindle 18 in alternating (oscillating) rotary motion about its axis A1.

The upper end 16 of the drive spindle 18 extends above and beyond an upper end 44 of the body 22, and includes a conical engagement surface 48, which is extended axially upwards by a threaded terminal shank 50. The drive head 14 has a conical through hole 52 which is complementary to the conical engagement surface 48, so that the drive head 14 can be introduced axially downwards around the threaded shank 50 until it engages against the conical engagement surface 48. The complementary conical hole 52 of the drive head 14 is wider at the bottom. It is therefore at its end having the larger diameter that this hole is open in the lower face 53 of the drive head 14.

A nut 54 is screwed on to the threaded terminal shank 50, and engages on a top surface of the drive head 14 so as to secure the drive head 14 axially against the conical engagement surface of the drive spindle 18.

The conical engagement surface 48 may be made smooth, so as to provide coupling between the complementary conical surfaces by adhesion, but in the embodiment shown in the drawings it is formed with splines which are parallel to its generatrix. The complementary conical hole 52 in the drive head 14 is also splined, so that when the drive head 14 is held axially against the conical engagement surface 48, the complementary surfaces provide a centering effect, together with axial positioning and rotational coupling, of a very high quality between the drive head 14 and the drive spindle 18.

Indexing means are provided, which enable the angular position of the screen wiper 12 about the axis A1, with respect to the drive spindle 18, to be precisely set. To this end, in the embodiment shown in FIGS. 1 and 2, the drive spindle 18 includes an annular ring 56 which lies in a plane at right angles to the axis A1 of the spindle 18. The annular ring 56 is mounted on the upper end 16 of the drive spindle 18, above the upper end 44 of the body 22 of the bearing 20, but below the conical engagement surface 48 of the drive spindle 18.

The annular ring 56 is fixed on the spindle 18 by any suitable means for ensuring that it is reliably fixed in position, for example by welding or force-fitting. In the latter case, the drive spindle 18 may for example be provided with axial knurls, similar to those formed at its lower end 30; and it may also have a radial shoulder surface to locate the annular ring 56 axially with respect to the spindle.

The annular ring 56 is formed with an indexing hole 58. In the example shown, this hole is open at both ends, but in another version it may be a blind hole which is open in the upper face 60 of the annular ring 56. The axis of the hole 58 is substantially parallel to the axis A1 of the drive spindle 18, but is offset radially with respect to the latter. The hole 58 receives an indexing spigot 62 of complementary form. The spigot 62 projects axially downwards from the lower surface 53 of the drive head 14, which faces towards the upper face 60 of the ring 56 when the screen wiper 12 is mounted on the spindle 18.

When the spigot 62 is received in the hole 58, precise annular indexation of the screen wiper 12 with respect to the spindle 18 is obtained about the axis A1.

The hole 58 in the annular ring 56 may be formed before the latter is fitted on to the drive spindle 18, in which case it is necessary to position the ring 56 in a precise angular orientation while it is being fitted on to the drive spindle 18. Alternatively, the hole 58 may be formed after the ring 56 is fitted on the spindle 18, or even after the crank 38 has been fitted on to the lower end 30 of the spindle 18. In either of the latter two cases, it is easy to obtain a precise angular position of the hole 58 about the axis A1 with respect to the drive spindle 18 and with respect to the crank 38.

The spigot 62 may, as desired, be formed integrally with the drive head 14, or it may be in the form of a separate component, which may for example be force-fitted into a suitable recess formed for this purpose in the lower surface 53 of the drive head 14.

In order to fit the screen wiper 12 on to the upper end of the drive spindle 18, the drive head 14 is introduced axially downwards around the upper end 16 of the drive spindle 18, until the spigot 62 comes into contact with the upper face 60 of the annular ring 56. It is desirable that the axial dimension of the spigot 62 should be such that when it is in contact with the upper face 60 of the ring 56, it prevents any cooperation between the corresponding conical surfaces 48 and 52 of the drive spindle 18 and drive head 14 respectively, so as to ensure that the screen wiper can be rotated freely about the axis A1.

The spigot 62 is then brought into angular concordance with the hole 58 in the ring 56, and the axial fitting of the drive head 14 on to the spindle 18 is then carried out. Fitting of the nut 58 on the threaded terminal shank 50 then definitively completes the assembly of the screen wiper 12 on its drive spindle 18.

In order to avoid any friction between the annular ring 56 and the upper end 44 of the bearing 20, which are movable with respect to each other, an axial clearance is provided between these two elements 56 and 44.

If the complementary conical surfaces 48 and 52, by which the screen wiper 12 and its drive spindle 18 are coupled together, are smooth, it is of advantage to provide a clearance, as small as possible, between the spigot 62 and the hole 58, in such a way that the spigot 62 can then act as a part in the rotational coupling and thus transmit part of the torque necessary for the oscillating wiping movement of the wiper.

By contrast, in the case where the conical surfaces 48 and 52 are knurled or splined, it is preferable to provide a sufficiently large clearance between the spigot 62 and the hole 58 to enable the splines formed in relief on one of these surfaces to be brought into correspondence with the recesses between the splines of the opposite conical surface.

Reference is now made to FIG. 3, which shows a modified version of the indexing means. In this embodiment, the annular ring 56 includes in its upper face 60 an annular pad 64, having an external diameter which is smaller than the external diameter of the annular ring 56. The pad 64 includes a radial finger 66.

The lower surface of the drive head 14 is formed with a recess 68, the form of which corresponds with that of the pad 64. The pad 64 is received in the recess 68 when the screen wiper is fitted on to the drive spindle 18. The axial depth and axial thickness of the recess 68 and pad 64 respectively are so chosen as to leave a radial clearance between the upper surface 70 of the pad 64 and the transverse base surface of the recess 68, so as not to disturb the correspondence of the two complementary conical surfaces 48 and 52 of the drive spindle 18 and drive head 14, respectively, which provide the rotational coupling.

In this embodiment, the annular ring 56 includes a cylindrical skirt portion 72 which projects axially downwards from the outer periphery of the ring 56, around the upper end 44 of the bearing 20.

By providing a radial clearance r (FIG. 4) between the inner cylindrical surface 74 of the skirt portion 72 and the outer cylindrical surface 76 of the upper end 44 of the bearing 20, the skirt portion 72 defines a sealing labyrinth which protects the rotary mounting of the spindle 18 within the body 22 of the bearing 20 against ingress of dust and spray.

Figure 5:
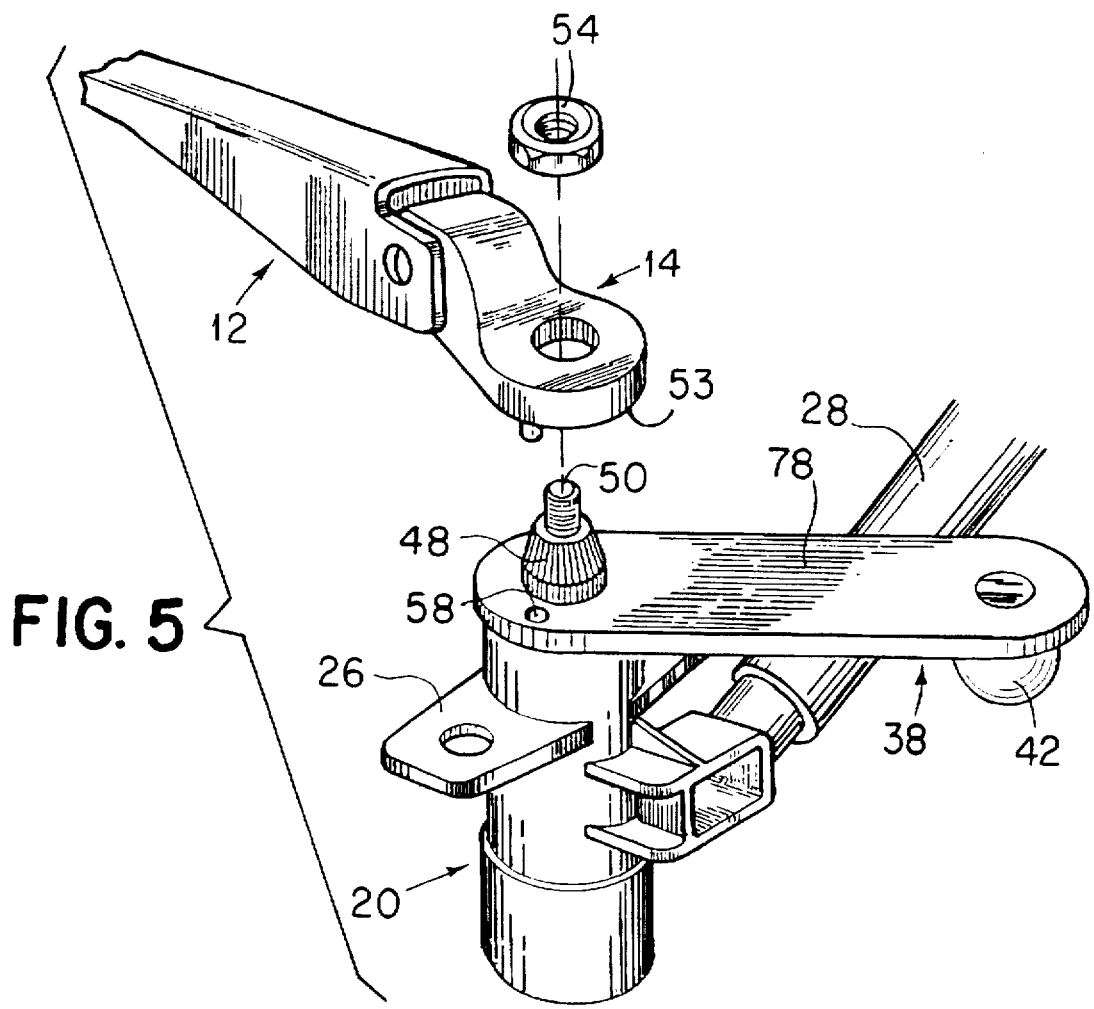
FIG. 5 is a view similar to that in FIG. 1, but shows a further embodiment of the invention.
Figure 6:
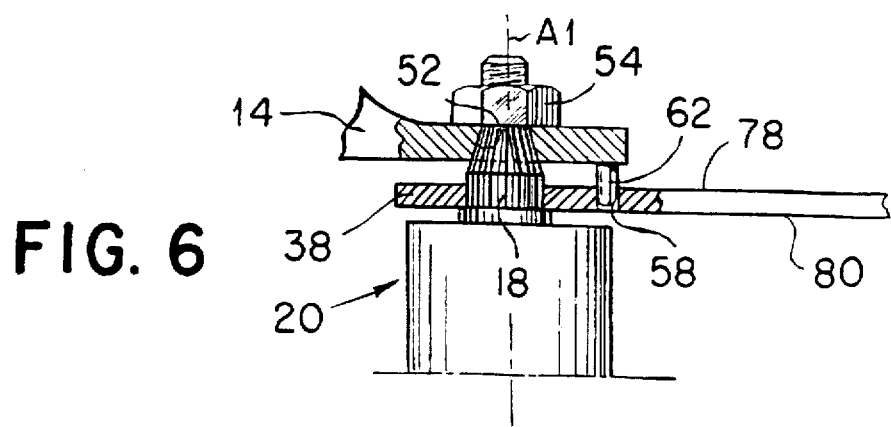
FIG. 6 is a view similar to FIG. 2, relating to the embodiment shown in FIG. 5.

Reference is now made to FIGS. 5 and 6, which show a further embodiment, in which the screen wiper apparatus 10 includes a crank 38 which is mounted on the upper end 16 of the drive spindle 18, instead of the lower end of the latter. The crank 38, which, as in the first embodiment shown in FIGS. 1 and 2, consists of an elongate plate member, is then fitted on the drive spindle 18 in place of the annular ring 56, under the conical engagement surface 48 but over the upper end 44 of the bearing 20.

In the embodiment shown in FIGS. 5 and 6, a hole 58 is formed on the end 36 of the crank 38. The hole 58 receives the spigot 62, which is again carried on the lower face 53 of the drive head 14, so as to constitute means for indexing the position of the screen wiper 12 with respect to the drive spindle 18.

Figure 4:
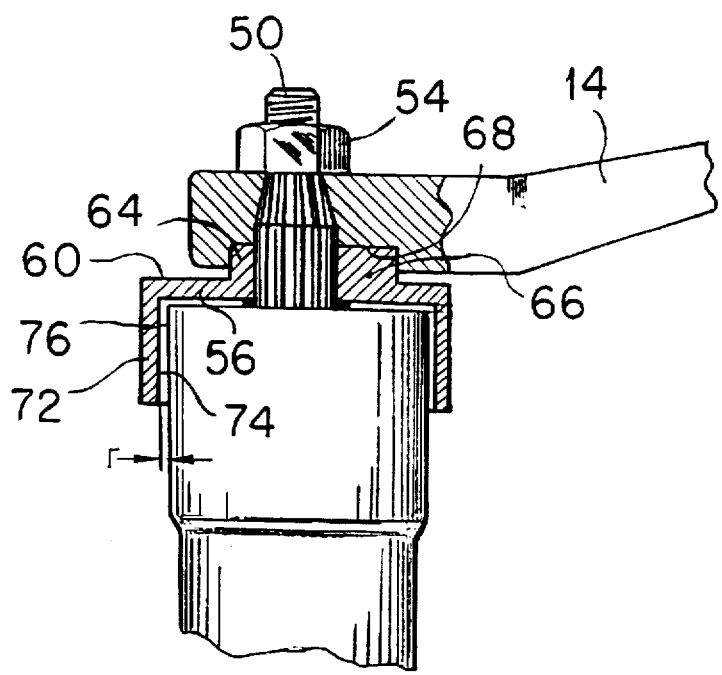
FIG. 4 is a partial view in axial cross section of the arrangement seen in FIG. 3.

In the case where the crank 38 is fitted on the upper end 16 of the drive spindle, indexing means of the kind shown in FIGS. 3 and 4 may also be used. The pad, with its radial finger, corresponding to the pad and finger 64 and 66 respectively in FIG. 3, is then formed on the upper face 78 of the crank 38, while the lower face 80 of the latter may be provided with a cylindrical skirt (not shown) which projects axially downwardly around the upper end 44 of the bearing 20.

What is claimed is:

1. A screen wiper apparatus for a motor vehicle having a fixed structure, the apparatus comprising: a bearing fixed on an element of the structure; a drive spindle defining an axis for establishing an angular position and mounted in said bearing for rotation therein about said drive spindle having one end extending outside and beyond said bearing; a screen wiper, including a drive head for establishing a fixed indexed angular position relative to said drive spindle, the apparatus including coupling means for securing said drive head on said drive spindle one end; a drive motor; and transmission means coupling said drive motor to said drive spindle and including a crank connected to said drive spindle for driving said spindle in rotation whereby to impart rotary motion to the screen wiper via said drive head, wherein the apparatus includes a member coupled in rotation to said drive spindle and further includes indexing means having a first and a second indexing element for said indexed angular position of said drive head with respect to said drive spindle, said member coupled to said drive spindle including said first indexing element, and said drive head having said second indexing element, for cooperation with said first indexing element and wherein each of said coupling means and said indexing means have means defining complementary cooperating forms which come into engagement with each other by axial mating engagement when said driving head is fitted axially in a first direction on to said one end of said drive spindle, with said indexing elements of said indexing means coming into engagement with each other before those of said coupling means come into engagement with each other, said first and second indexing elements defining an axially projecting spigot and an annular ring coupled in rotation with said drive head and said drive spindle, said first and second indexing elements defining a hole complementary with said spigot, said spigot being received in said hole.

2. Apparatus according to claim 1, wherein the bearing has an end, said member coupled in rotation with said drive spindle being disposed on said one end of the drive spindle between said end of the bearing and said drive head.

3. Apparatus according to claim 1, wherein said drive head has a face and said member coupled in rotation with said drive spindle has a face, said indexing elements of complementary form being defined on said drive head face and said member face, respectively.

4. Apparatus according to claim 1, wherein said ring is fixed on said drive spindle.

5. Apparatus according to claim 1, wherein said coupling means coupling said drive head and said drive spindle together comprise complementary conical surfaces, said member coupled in rotation to said drive spindle being spaced from said conical surface carried by said drive spindle.

* * * * *